US007539865B2

(12) United States Patent
Hatakeyama

(10) Patent No.: US 7,539,865 B2
(45) Date of Patent: May 26, 2009

(54) DATA TRANSFER DEVICE

(75) Inventor: Hideyuki Hatakeyama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 870 days.

(21) Appl. No.: 11/061,846

(22) Filed: Feb. 18, 2005

(65) Prior Publication Data

US 2005/0193215 A1  Sep. 1, 2005

(30) Foreign Application Priority Data

Feb. 26, 2004  (JP)  ............... 2004-050783

(51) Int. Cl.
*H04L 9/00* (2006.01)
(52) U.S. Cl. ............ 713/169; 713/168; 713/150
(58) Field of Classification Search .......... 713/169, 713/150, 168
See application file for complete search history.

(56) References Cited

U.S. PATENT DOCUMENTS

| 6,789,177 | B2 | 9/2004 | Okada |
| 6,826,699 | B1 | 11/2004 | Sun |
| 2004/0039505 | A1 | 2/2004 | Vollmer |

FOREIGN PATENT DOCUMENTS

| DE | 10023705 A1 | 11/2001 |
| EP | 1198134 A | 4/2002 |
| JP | 08317426 A | 11/1996 |

OTHER PUBLICATIONS

Kamel, I.; Niranjan, T.; Ghandeharizedah, S.; Data Engineering, 2000. Proceedings. 16th International Conference on Feb. 29-Mar. 3, 2000 pp. 349-361.*
A dynamic reservation protocol for multi-priority multi-rate dataservices on GSM networks;Hongbing Zhang Tak-Shing Peter Yum; Dept. of Inf. Eng., Chinese Univ. of Hong Kong, Shatin;, 1997. ICC 97 Montreal, 'Towards the Knowledge Millennium'. 1997 IEEE International Conference on;vol. 3, On pp. 1261-1265 vol. 3.*
A new online auction with convertible authenticated encryption and authentication Guo-Lun Luo; Ker-Chang Chang, H.; Intelligence and Security Informatics, 2008. ISI 2008. IEEE International Conference on Jun. 17-20, 2008 pp. 288-289.*
Alternative Pair-wise Key Exchange Protocols (IEEE 802.11i) in Wireless LANs Manivannan, N.; Neelameham, P.; Wireless and Mobile Communications, 2006. ICWMC '06. International Conference on Jul. 29-31, 2006 pp. 52-52.*
KEAML—Key Exchange and Authentication Markup Language Xuebing Qing; Adams, C.; Electrical and Computer Engineering, 2006. CCECE '06. Canadian Conference on May 2006 pp. 634-638.*

(Continued)

*Primary Examiner*—David Y Jung
(74) *Attorney, Agent, or Firm*—Brinks Hofer Gilson & Lione

(57) ABSTRACT

A digital versatile disk (DVD) player includes a content playback unit and an authentication control unit. The content playback unit sends data of encrypted content to a plurality of devices. The authentication control unit performs authentication processing with each of the plurality of devices, and sends key information for decrypting the encrypted content to the plurality of devices after completing the authentication processing.

20 Claims, 8 Drawing Sheets

OTHER PUBLICATIONS

Harney C. Muckenhirn Sparta H., et al.: "Group Key Management Protocol (GKMP) Specification; rfc2093.txt" IETF Standard, Internet Engineering Task Force, IETF, CH, Jul. 1, 1997, XP015007877, ISSN: 0000-0003.

Burmester M., et al: "Secure and Efficient Conference Key Distribution System" Advances in Cryptology-Eurocrypt; International Conference on the Theory and Application of Cryptographic Techniques, Springer Verlag, DE, Jan. 1, 1995.

5C Digital Transmission Content Protection White Paper: Internet Citation, [Online] XP002213172 Retrieved from the Internet: URL: http://www.dtcp.com/data/wp_spec.pdf> [retrieved on 2002-09011].

* cited by examiner

DATA TRANSFER DEVICE

BACKGROUND OF THE INVENTION

1. Technical Field

The present invention relates to data transfer devices that perform authentication processing with a plurality of devices and that transfer data to the plurality of devices.

2. Background Information

Various devices, such as compact disk (CD) changers, digital versatile disk (DVD) players, digital broadcasting receivers, monitors, and amplifiers, are installed in vehicles, so that users can enjoy music and pictures by selecting corresponding devices. Connecting these devices using digital buses, such as IEEE 1394 buses, enables high-quality data transfer, and music with high-quality sound and pictures with high image quality can thus be produced.

Some content recorded on DVDs or some content distributed using digital broadcasting may include copy control information for copy restriction in terms of copyright protection. For example, in order to play back a DVD for DVD-Video and to transfer picture data to a monitor, a DVD player transfers picture data encrypted using copy control information recorded on the DVD, and a monitor that receives the encrypted picture data decrypts the details of the picture data and displays the decrypted picture data.

Various algorithms exist as technologies for protecting content to be transferred. For example, a procedure in which key exchange necessary for encrypting and decrypting content is performed after authentication between devices is performed is described in Japanese Unexamined Patent Application Publication No. 2003-30054 (second to ninth pages, FIGS. 1 to 8).

As described in Japanese Unexamined Patent Application Publication No. 2003-30054, in a case where key exchange is performed after authentication between devices is performed, when a sending device transfers content to a plurality of receiving devices, the plurality of receiving devices acquire keys to decrypt the content at different time periods from each other. This causes a user who tries to look at and listen to the details of the content to feel dissatisfied.

FIG. 8 illustrates a specific connection example of a plurality of devices. Referring to FIG. 8, a DVD player 200 is connected to monitors 210 and 212 and an amplifier 214 via IEEE 1394 buses 220. In order to decrypt and display the details of picture data of content sent from the DVD player 200 using the monitors 210 and 212 and in order to decrypt, using the amplifier 214, and generate, using a speaker, the details of music data of the content, authentication and key exchange must be performed between the DVD player 200 and the monitor 210, between the DVD player 200 and the monitor 212, and between the DVD player 200 and the amplifier 214 before the monitors 210 and 212 and the amplifier 214 perform processing. For example, first, if key exchange is performed after authentication processing between the DVD player 200 and the monitor 210 is completed, a certain amount of time (for example, about one second) is required for displaying the details of content after the key exchange. Then, if key exchange is performed after authentication processing between the DVD player 200 and the monitor 212 is completed, a certain amount of time (for example, about one second) is required for displaying the details of the content after the key exchange. Finally, if key exchange is performed after authentication processing between the DVD player 200 and the amplifier 214 is completed, a certain amount of time (for example, about one second) is required for generating music as the details of the content after the key exchange. Accordingly, after the monitor 210 displays the details of the content, about two seconds are required for generating music corresponding to the details. During this time, only a picture is displayed without sound. Thus, a user feels dissatisfied since the user implicitly expects that pictures and music are generated output at the same time. The time required for generating music corresponding to the details of content after a picture is displayed increases in accordance with an increase in the number of connected devices for which authentication is required.

SUMMARY OF THE INVENTION

Accordingly, an object of the present invention is to provide a data transfer device capable of preventing user dissatisfaction due to a difference in decryption timings between connected devices.

In order to achieve the above object, according to an aspect of the present invention, a data transfer device includes a data sending unit for sending data of encrypted content to a plurality of devices; an authentication control unit for performing authentication processing with each of the plurality of devices; and a key information sending unit for sending key information for decrypting the encrypted content to the plurality of devices after the authentication processing by the authentication control unit for each of the plurality of devices is completed. Thus, even if a long time is required for completing authentication processing, devices to which content is sent can obtain key information at approximately the same time. Therefore, user dissatisfaction due to a difference in decryption time periods between the devices can be prevented.

Preferably, the sending of the key information is started by sending a key exchange command to each of the plurality of devices. Also, preferably, the key information sending unit stops sending the key exchange command until the authentication processing by the authentication control unit for all the plurality of devices for which the authentication processing is to be performed is completed. Thus, key information can be sent to the devices at the same time.

According to another aspect of the present invention, a data transfer device includes a data sending unit for sending data of encrypted content to a plurality of devices whose priority is determined in advance in order of descending priority; an authentication control unit for performing authentication processing with each of the plurality of devices; and a key information sending unit for sending key information for decrypting the encrypted content to the plurality of devices for which the authentication processing by the authentication control unit is completed. After the key information sending unit sends the key information to one of the plurality of devices, the data sending unit performs data transmission to the next device from among the plurality of devices. Thus, the order of data transmission can be set. Therefore, even if the decryption time periods are different between a plurality of devices, user dissatisfaction due to the difference in the decryption time periods can be prevented.

The data transfer device may further include a control unit for determining whether or not the key information has been sent to each of the plurality of devices and for sending to the data sending unit an instruction to send data to the next device to which the key information has not been sent from among the plurality of devices. Thus, the timing of data transmission can be controlled, and the decryption order can be set easily and accurately.

According to another aspect of the present invention, a data transfer device includes a data sending unit for sending data of encrypted content to a plurality of devices; an authentication control unit for performing authentication processing with each of the plurality of devices; a key information sending unit for sending key information for decrypting the encrypted content to the plurality of devices for which the authentication processing by the authentication control unit is completed; and an output stop instruction unit for giving an instruction to stop an output operation of sending a result obtained by decrypting the content to each of the plurality of devices until the key information has been sent to all the plurality of devices for which the authentication processing is performed. Thus, even if the decryption time periods are different between a plurality of devices, decrypted results can be produced at the same time. Thus, user dissatisfaction can be prevented.

Preferably, the output stop instruction unit gives the instruction to stop the output operation by sending a mute instruction to each of the plurality of devices. The use of a generally used mute instruction easily stops an output operation of each device.

Preferably, the stopping of the output operation includes stopping to send a result obtained by decrypting the content as sound and stopping to display a result obtained by decrypting the content as a picture. Thus, generation of sound and displaying of a picture can be performed at the same timing.

Preferably, the plurality of devices includes a device for sending a result obtained by decrypting the content as sound and a device for displaying a result obtained by decrypting the content as a picture. Thus, displaying of a picture and generating sound can be performed at approximately the same time between a plurality of devices. Therefore, a user who is looking at a picture with sound is prevented from being dissatisfied.

Preferably, the plurality of devices includes a plurality of devices for sending a result obtained by decrypting the content as sound. Thus, sound is generated at the approximately same time between the plurality of devices. Therefore, user dissatisfaction due to a difference in generation of combined sounds can be prevented.

The data transfer device may further include a content playback unit for generating the data of the content by playing back data recorded on a storage medium. Also, preferably, the content playback unit stops a playback operation until the authentication processing is completed. Thus, even if the timing of starting to decrypt content is delayed due to a long time required for authentication processing and the like, an unwanted incomplete or piecemeal production of the initial content by delayed decryption can be prevented.

Preferably, the plurality of devices is connected to each other via a digital bus. Thus, data of encrypted content can be sent to a plurality of devices. Therefore, user dissatisfaction due to a difference in decryption time periods when the foregoing arrangement is used can be effectively prevented.

Preferably, the authentication processing starts after an authentication start request is sent from each of the plurality of devices that receives the data of the content. In a case where authentication processing is performed after receiving an authentication start request sent from each of the devices to which data is sent, the order of authentication processing performed for the plurality of devices cannot be specified. However, since key information can be sent at the same time even in this case, decryption can be performed at the same time between the devices.

Preferably, the plurality of devices does not record the content. Also, preferably, the authentication control unit performs authentication processing corresponding to full authentication. Thus, user dissatisfaction due to a difference in the decryption time periods between devices requiring an output operation can be prevented.

DETAILED DESCRIPTION OF THE PREFERRED EMBODIMENTS

An in-vehicle system according to embodiments to which a data transfer device according to the present invention is applied will be described with reference to the drawings.

First Embodiment

Figure 1:
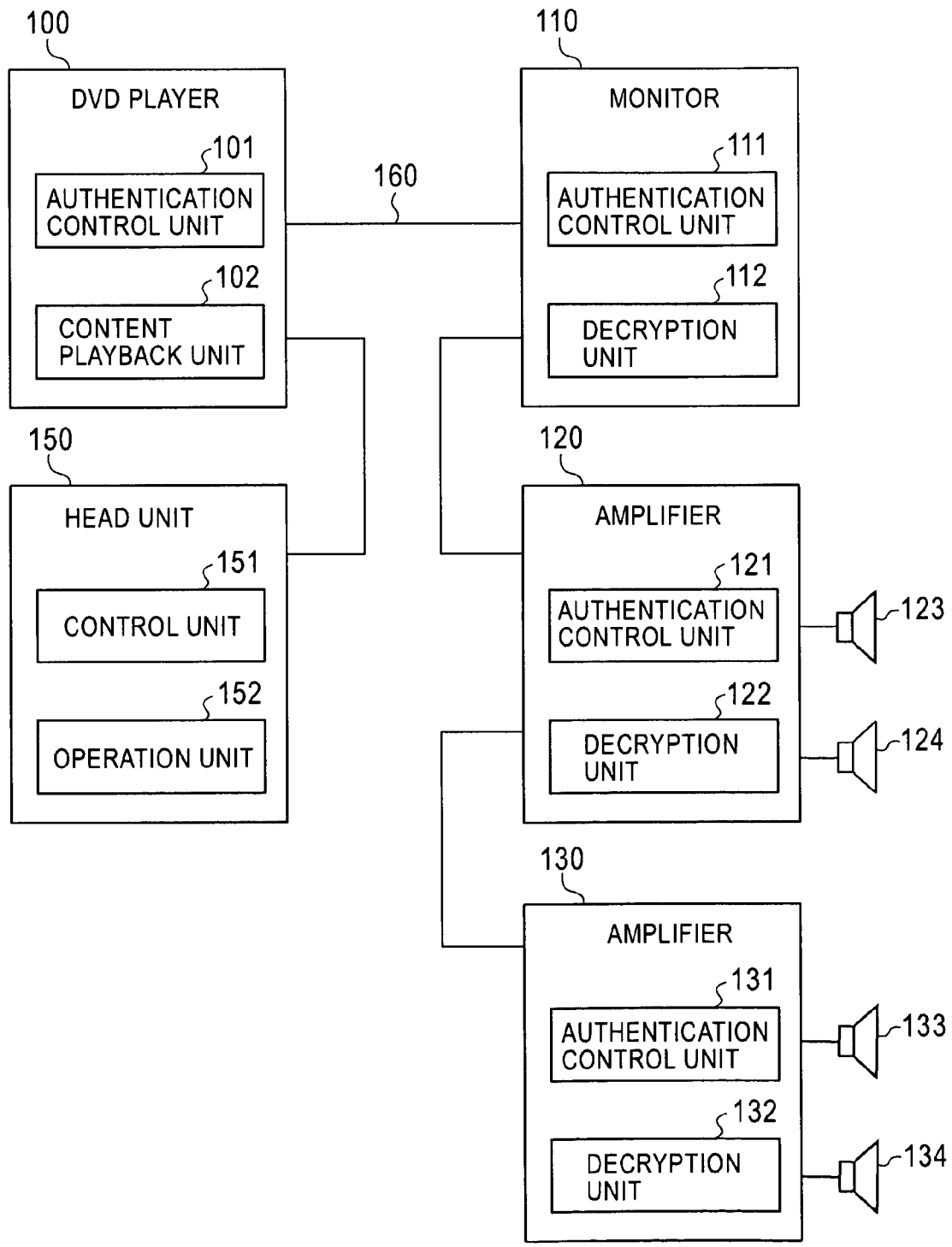
FIG. 1 shows the arrangement of an in-vehicle system according to a first embodiment of the present invention.

FIG. 1 shows the arrangement of an in-vehicle system according to a first embodiment of the present invention. The in-vehicle system shown in FIG. 1 includes a DVD player 100, a monitor 110, amplifiers 120 and 130, and a head unit 150. These devices are connected to each other via IEEE 1394 buses 160.

The DVD player 100 reads and plays back content (including pictures and music) recorded on a DVD functioning as a disk-type recording medium. The DVD player 100 includes an authentication control unit 101 and a content playback unit 102. The authentication control unit 101 performs authentication control operations, such as authentication processing and key exchange necessary for decrypting content of a copy-protected DVD. The content playback unit 102 plays back the details of the content read from the DVD, and sends the details of the content to each device. The content recorded on the DVD includes copy control information, and key exchange is performed based on the copy control information.

The monitor 110 is installed at the center of a dashboard of a vehicle and displays the details of picture data output from the DVD player 100. The monitor 110 includes an authentication control unit 111 for performing authentication control operations and a decryption unit 112 for decrypting encrypted picture data. After performing authentication processing with the authentication control unit 101 of the DVD player 100, which is a sender of the picture data, the authentication control unit 111 receives key information necessary for decryption. The decryption unit 112 decrypts, using the key information, the picture data sent from the DVD player 100. Accordingly, the monitor 110 displays the details of the transferred picture data.

The amplifier 120 is installed below the dashboard of the vehicle or below a passenger seat. After converting music data sent from the DVD player 100 into an audio signal, the amplifier 120 amplifies the audio signal and generates an amplified audio signal into a vehicle cabin from front speakers 123 and 124 provided at left and right of driver and passenger seats. The amplifier 120 includes an authentication control unit 121 for performing authentication control operations and a decryption unit 122 for decrypting encrypted music data. After performing authentication processing with the authentication control unit 101 of the DVD player 100, which is a sender of the music data, the authentication control unit 121 receives key information necessary for decryption. The decryption unit 122 decrypts, using the key information, the music data sent from the DVD player 100. Accordingly, the amplifier 120 plays back the transferred music data to be converted into an audio signal, and generates the audio signal from the front speakers 123 and 124.

The amplifier 130 is installed below the dashboard of the vehicle or below the passenger seat. After converting music data sent from the DVD player 100 into an audio signal, the amplifier 130 amplifies the audio signal and sends the amplified audio signal into the vehicle cabin from rear speakers 133 and 134 provided at left and right behind backseats. The amplifier 130 includes an authentication control unit 131 for performing authentication control operations and a decryption unit 132 for decrypting encrypted music data. After performing authentication processing with the authentication control unit 101 of the DVD player 100, which is a sender of the music data, the authentication control unit 131 receives key information necessary for decryption. The decryption unit 132 decrypts, using the key information, the music data sent from the DVD player 100. Accordingly, the amplifier 130 plays back the transferred music data to be converted into an audio signal, and generates the audio signal from the rear speakers 133 and 134.

The head unit 150 is installed at the center of the dashboard of the vehicle. The head unit 150 includes a control unit 151 for controlling the entire in-vehicle system and an operation unit 152 for receiving various operation inputs by a user. A touch panel may be installed near a screen of the monitor 110 so that the operation unit 152 implements operations using the touch panel.

The content playback unit 102 corresponds to a data sending unit and a content playback unit, and the authentication control unit 101 corresponds to an authentication control unit and a key information sending unit.

The in-vehicle system according to the first embodiment has the foregoing arrangement. Operations from authentication processing to key exchange are described next.

Figure 2:
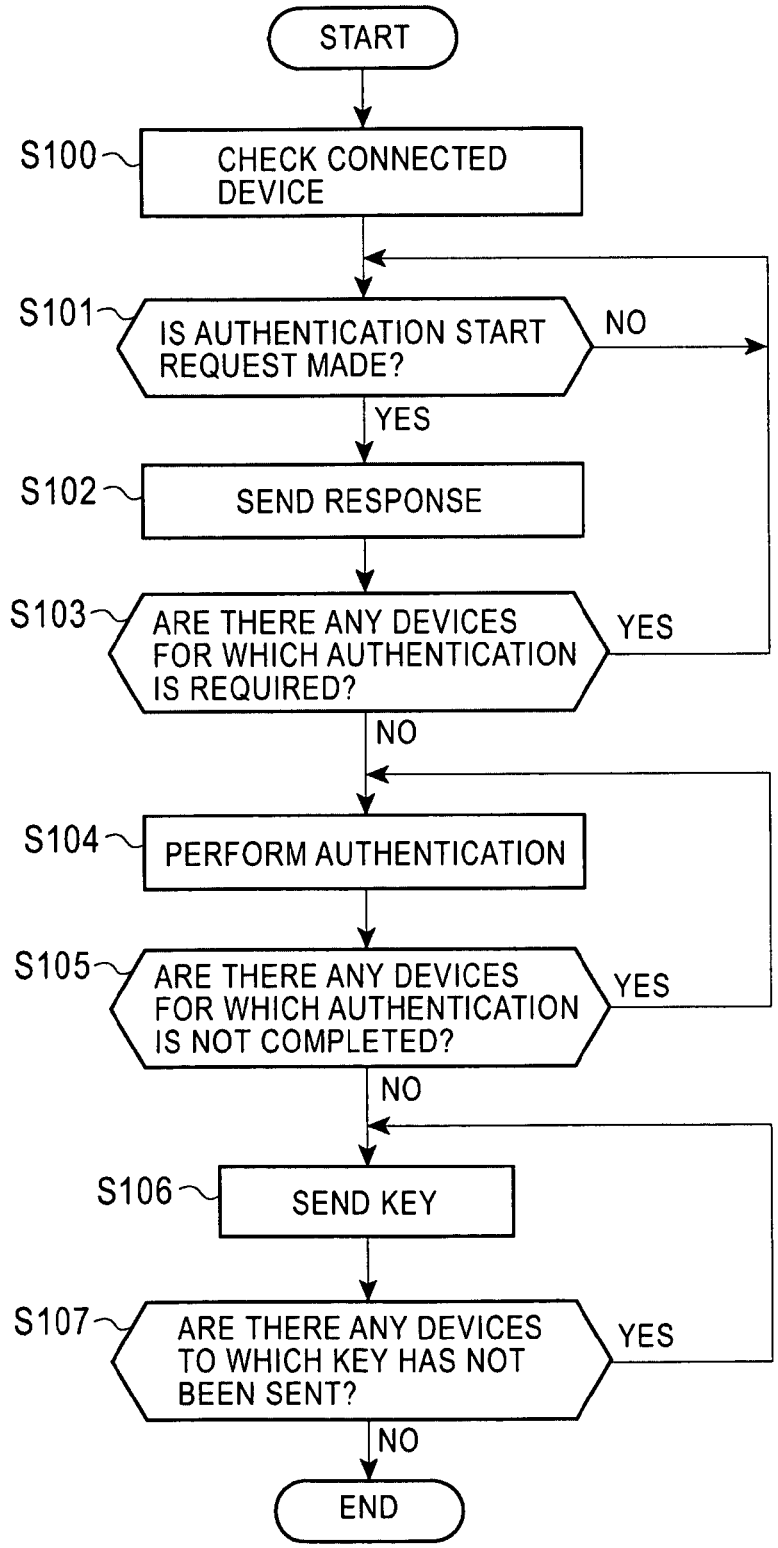
FIG. 2 is a flowchart showing a process related to authentication processing performed by an authentication control unit of a DVD player.

FIG. 2 is a flowchart showing a process related to authentication processing performed by the authentication control unit 101 of the DVD player 100. When the DVD player 100, the monitor 110, the amplifiers 120 and 130, and the head unit 150 are powered up, after checking each connected device, such as the monitor 110 (step S100), the authentication control unit 101 determines whether or not an authentication start request is made by any device (step S101). If an authentication start request is not made by any device, a negative determination is made in step S101, and the processing in step S101 is repeated.

If an authentication start request is made by any device, an affirmative determination is made in step S101. Then, the authentication control unit 101 sends a "start permission" response, which represents that authentication can be started, to the device that sent the authentication start request (step S102). Then, the authentication control unit 101 determines whether or not there are any devices for which authentication processing is required (step S103). Since authentication processing must be performed with each of three devices (the monitor 110 and the amplifiers 120 and 130) in the arrangement shown in FIG. 1, if there are any devices, from among the three devices, for which an authentication start request has not been made, an affirmative determination is made in step S103. The process returns to step S101 to repeat the determination of whether or not an authentication start request is made.

If transmission and reception of an authentication start request and a response between the DVD player 100 and each of the three devices is completed, a negative determination is made in step S103. Then, the authentication control unit 101 performs authentication processing with one of the devices (step S104). Then, the authentication control unit 101 determines whether or not there are any devices for which authentication processing is not completed (step S105). If there are any devices, from among the three devices for which authentication processing is required, for which authentication processing is not completed, an affirmative determination is made in step S105. Then, the process returns to step S104 to perform authentication processing with the device for which authentication processing is not completed.

If authentication processing with each of the three devices is completed, a negative determination is made in step S105. Then, the authentication control unit 101 sends key information to one of the devices for which authentication processing is completed (step S106). Then, the authentication control unit 101 determines whether or not there are any devices to which key information has not been sent (step S107). If there are any devices to which key information has not been sent, an affirmative determination is made in step S107. The process returns to step S106 to repeat the processing of sending key information and the subsequent processing. If key information has been sent to all of the three devices, a negative determination is made in step S107, and the process related to authentication ends.

Figure 3:
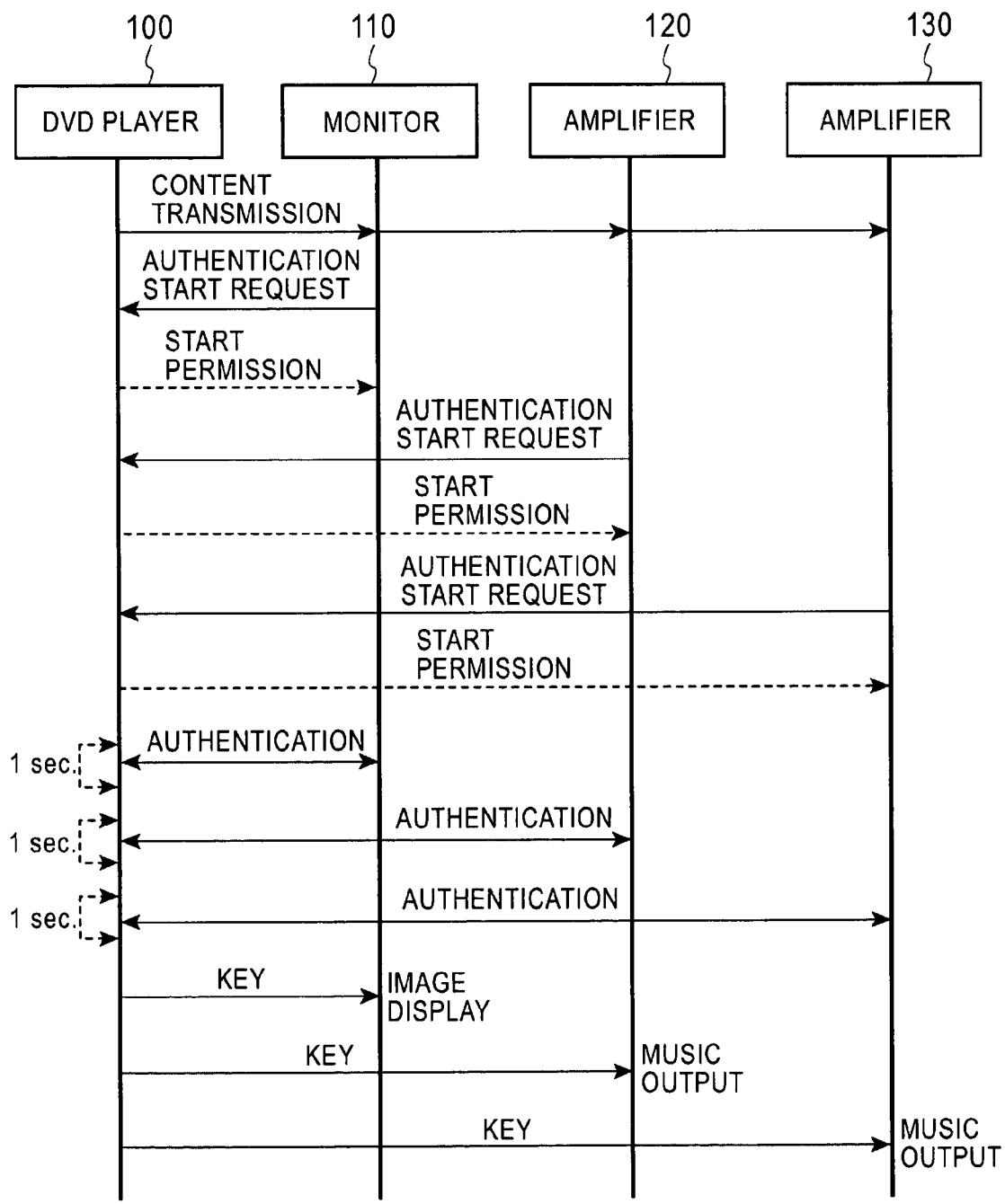
FIG. 3 illustrates the time periods of a series of processing events related to authentication performed between devices shown in FIG. 1.

FIG. 3 illustrates the timings of a series of processing events related to authentication performed between the devices shown in FIG. 1. When connected devices are powered up and become able to operate, the DVD player 100 starts to send content to the monitor 110 and the amplifiers 120 and 130, and the series of processing events related to authentication start in parallel to transmission of the content.

When an authentication start request is sent from each of the monitor 110 and the amplifiers 120 and 130, the authentication control unit 101 of the DVD player 100 sends a "start permission" response corresponding to the request to each of the monitor 110 and the amplifiers 120 and 130. Transmission and reception of the request and the response is completed in a short time. The order of transmission of authentication start requests is determined in accordance with a time required for starting a normal operation after a device is powered up and in accordance with a connection form of the device. However, in the explanations below, authentication processing and the like are performed for the monitor 110, the amplifier 120, and the amplifier 130 in that order, as shown in FIG. 3.

Then, the authentication control unit 101 performs authentication processing with the monitor 110. Then, similarly, the authentication control unit 101 performs authentication processing with each of the amplifiers 120 and 130. A certain amount of time is required for the authentication processing. For example, if about one second is required for each authentication processing operation, about three seconds are required in total.

Then, the authentication control unit 101 sends key information to each of the monitor 110 and the amplifiers 120 and 130. Transmission of the key information is completed in a short time.

Figure 4:
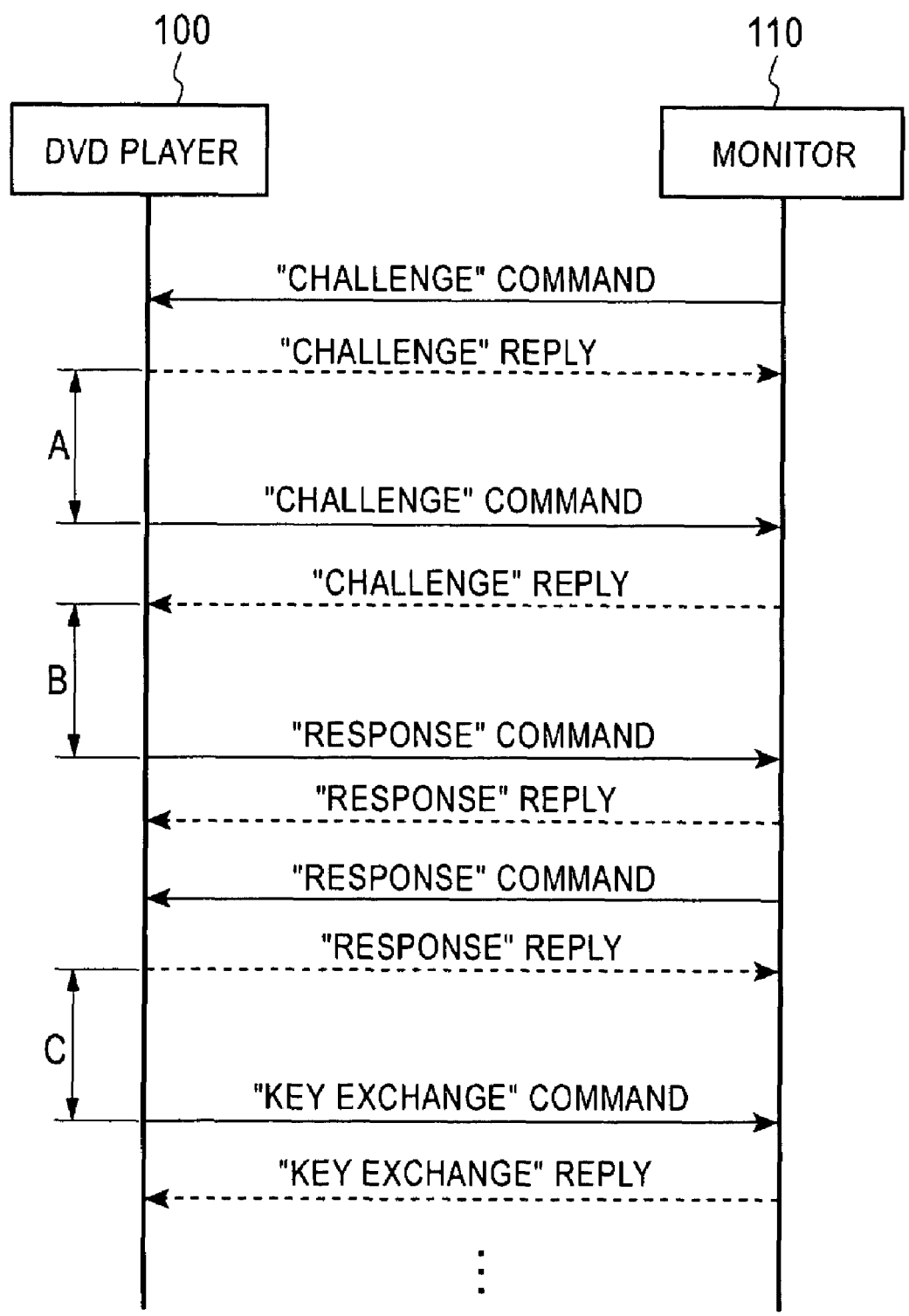
FIG. 4 is a detailed illustration showing the time periods of authentication processing corresponding to full authentication and key information transmission.

FIG. 4 is a detailed illustration showing the time periods of authentication processing and key information transmission. For example, the details of authentication processing performed between the DVD player 100 and the monitor 110 are shown in FIG. 4. Authentication processing performed between the DVD player 100 and each of the amplifiers 120 and 130 is similar to the authentication processing performed between the DVD player 100 and the monitor 110. Also, since the devices including the monitor 110 does not record transferred content, a processing timing for "full authentication" performed between the DVD player 100 and the monitor 110 is shown in FIG. 4.

As shown in FIG. 4, authentication processing starts when the monitor 110 sends a "challenge" command to the DVD player 100. The DVD player 100 sends a "challenge" reply to the monitor 110. Then, the DVD player 100 sends a "challenge" command to the monitor 110, and receives a "challenge" reply sent from the monitor 110.

Then, the DVD player 100 sends a "response" command to the monitor 110, and receives a "response" reply sent from the monitor 110. Then, the DVD player 100 receives a "response" command sent from the monitor 110, and sends a "response" reply to the monitor 110.

As described above, authentication processing is performed between the DVD player 100 and the monitor 110. Then, the DVD player 100 sends a "key exchange" command as key information to the monitor 110, and receives a "key exchange" reply sent from the monitor 110. Accordingly, transmission processing of key information to the monitor 110 ends.

After processing immediately before transmission of a "key exchange" command is performed for each of the monitor 110 and the amplifiers 120 and 130, the authentication control unit 101 of the DVD player 100 sends the "key exchange" command to each of the devices.

Although a case where authentication processing between the DVD player 100 and each of the monitor 110 and the amplifiers 120 and 130 starts after transmission and reception of an authentication start request and a "start permission" response for each of the monitor 110 and the amplifiers 120 and 130 is completed is described in the example shown in FIG. 3, authentication processing may start by a "challenge" command sent from the monitor 110 or the amplifier 120 before the amplifier 130 sends an authentication start request to the DVD player 100. In this case, the authentication control unit 101 of the DVD player 100 may wait at time period A or time period B shown in FIG. 4 and stop the authentication processing by stopping transmission of a "challenge" command or a "response" command. Alternatively, the authentication control unit 101 of the DVD player 100 may wait at time period C shown in FIG. 4 and wait in a state in which the authentication processing ends.

As described above, in the in-vehicle system according to the first embodiment, even if authentication processing between the DVD player 100 and each of devices connected to the DVD player 100 requires a long time, the devices to which content is sent can obtain key information at approximately the same time. Thus, user dissatisfaction due to a difference in the decryption timings between the devices is prevented. In particular, by stopping transmission of a key exchange command until authentication processing for all the devices is completed, key information can be sent to all the devices at the same time.

Second Embodiment

Although a difference in time periods at which decryption starts is prevented by waiting in a state in which authentication processing for all the devices to which content is sent is completed and by performing key exchange (key information transmission) for all the devices at the same time in the first embodiment, the order of devices for which authentication processing is performed may be set in advance so as to reduce user dissatisfaction while a series of authentication processing events to key exchange is performed for each device, as in known technologies.

The arrangement shown in FIG. 1 can be applied to the basic arrangement of an in-vehicle system according to a second embodiment. However, the content playback unit 102 of the DVD player 100 does not start to generate the details (picture data and music data) of content to all the devices when the devices are powered up. The content playback unit 102 of the DVD player 100 starts to produce the details of the content to each of the devices after receiving an output start instruction sent from the head unit 150.

For example, the priority corresponding to the arrangement shown in FIG. 1 is set to (1) the amplifier 120, (2) the monitor 110, and (3) the amplifier 130, in that order. In other words, first, decryption by the amplifier 120 starts, and music is generated from the front speakers 123 and 124. Then, decryption by the monitor 110 starts, and a picture is displayed. Finally, decryption by the amplifier 130 starts, and music is generated from the rear speakers 133 and 134.

Figure 5:
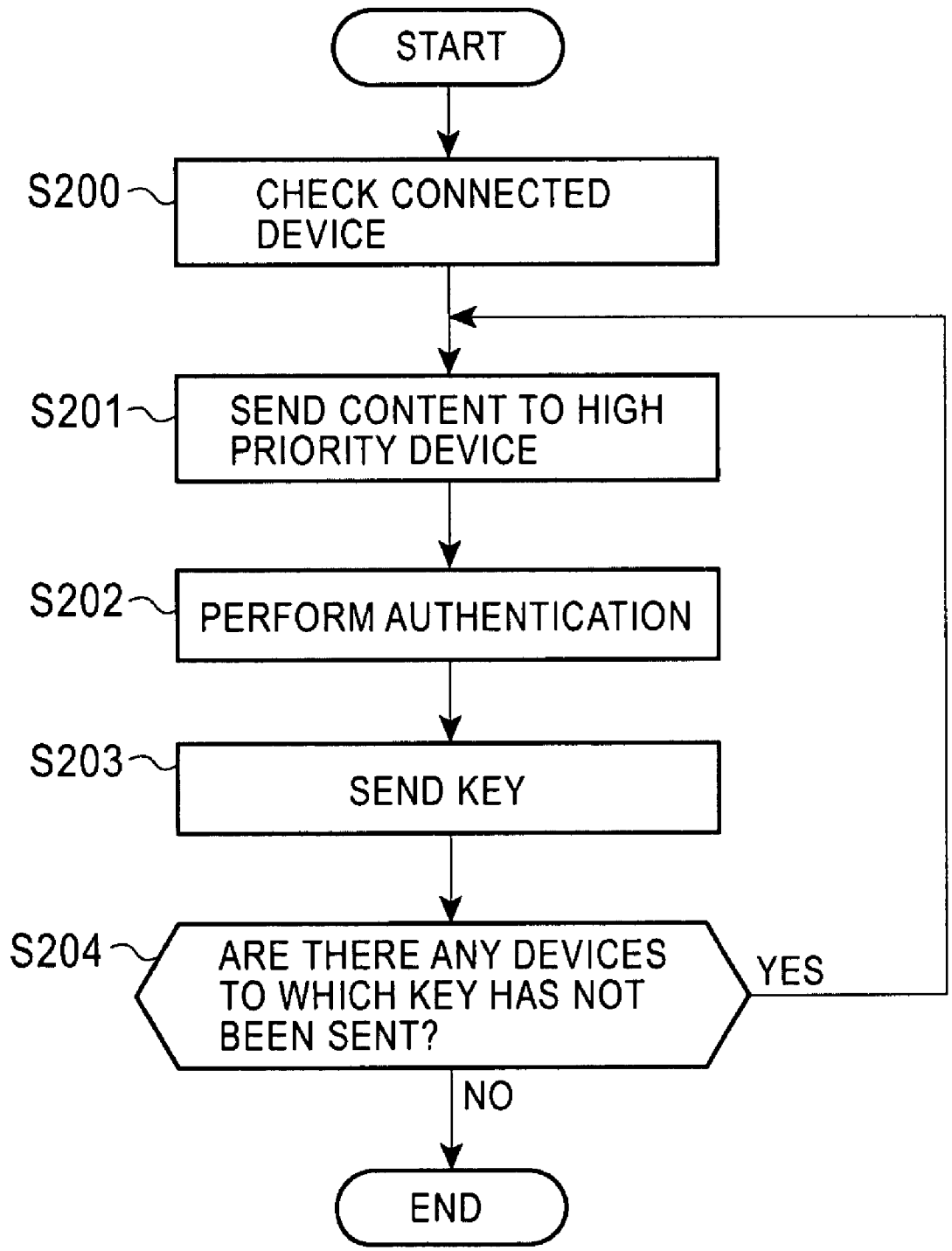
FIG. 5 is a flowchart showing a process related to authentication processing according to a second embodiment of the present invention performed by a control unit of a head unit and an authentication control unit and a content playback unit of a DVD player.

FIG. 5 is a flowchart showing a process related to authentication processing performed by the control unit 151 of the head unit 150 and the authentication control unit 101 and the content playback unit 102 of the DVD player 100. When the DVD player 100, the monitor 110, and the amplifiers 120 and 130 are powered up, after checking each connected device, such as the monitor 110 (step S200), the control unit 151 functioning as a control unit sends to the content playback unit 102 an instruction to send content to a high priority device (for example, the amplifier 120). As a result, the content is sent only to the amplifier 120 (step S201). Then, authentication processing (step S202) and key information transmission (step S203) are performed between the amplifier 120, which receives the content, and the DVD player 100. Since the amplifier 120, which receives the key information, can decrypt received content, production of music corresponding to the received content from the front speakers 123 and 124 starts.

When processing to key information transmission is completed for the device, the control unit 151 determines whether or not there are any devices to which key information has not been sent (step S204). If key information is sent only to the amplifier 120, since the monitor 110 and the amplifier 130, to which key information has not been sent, exists, an affirmative determination is made in step S204. The process returns to step S201 to perform processing of sending content to a next highest priority device to which key information has not been sent and the subsequent processing. As described above, authentication processing and key information transmission for the monitor 110 and the amplifier 130 are performed in order.

If processing to key information transmission for all the three devices including the monitor 110 is completed, a negative determination is made in step S204, and the process related to authentication ends.

As described above, in the in-vehicle system according to the second embodiment, the order of data transmission can be set. Thus, even if decryption timings are different between a plurality of devices, user dissatisfaction due to the difference in the decryption timings can be reduced. In particular, by controlling the timing of sending content from the DVD player 100 to each device, the decryption order can be set easily and accurately.

Third Embodiment

Although user dissatisfaction is reduced by determining the priority of the three devices connected to the DVD player 100 and by setting the order of generating pictures and music in the second embodiment, a mute instruction to stop production of pictures and music by the devices until key exchange for all the devices is completed may be given while a series of authentication processing events are performed as in the known technology.

Figure 6:
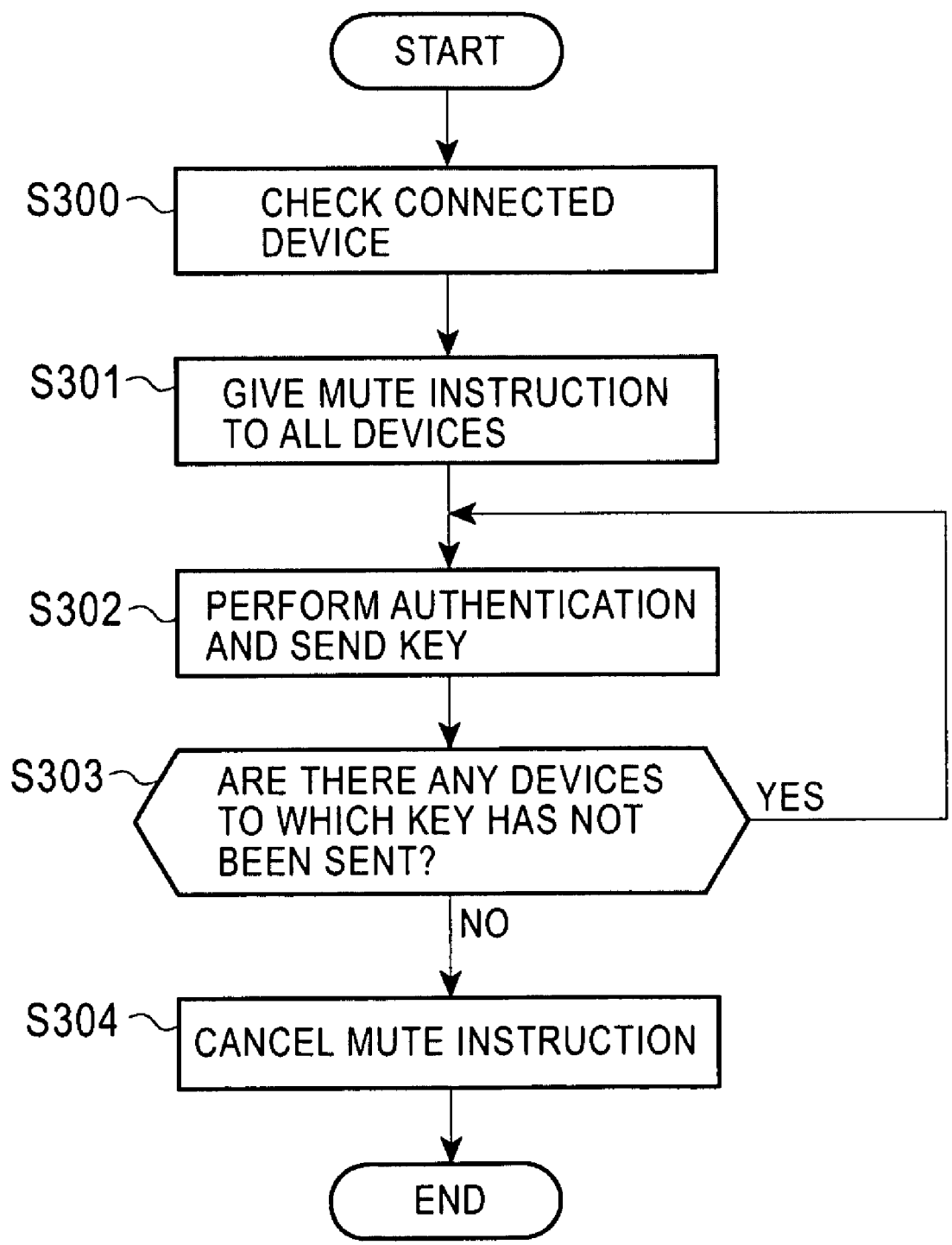
FIG. 6 is a flowchart showing a process according to a third embodiment of the present invention for giving a mute instruction to each of the devices connected to a DVD player until authentication processing and the like for all the devices is completed.

FIG. 6 is a flowchart showing a process for giving a mute instruction to each device until authentication processing and the like for all the devices connected to the DVD player 100 is completed. The control unit 151 corresponds to an output stop instruction unit. When the DVD player 100, the monitor 110, and the amplifiers 120 and 130 are powered up, after checking each connected device, such as the monitor 110 (step S300), the control unit 151 gives an instruction to mute to all the devices for which authentication processing is required (step S301). A "mute" state includes a case where the brightness and the level of color information of a picture are 0 (a state in which the whole screen is black and no picture is displayed) as well as a case where the volume level of music is 0.

Then, a series of processing events related to authentication from authentication start request to key information transmission is performed between the DVD player 100 and the monitor 110 or the like (step S302). After processing of the key information transmission to the device is completed, the control unit 151 determines whether or not there are any devices to which key information has not been sent (step S303). If there is a device to which key information has not been sent, an affirmative determination is made in step S303. The process returns to step S302 to repeat authentication processing.

Also, if processing of the key information transmission to all of the three devices including the monitor 110 is completed, a negative determination is made in step S303. Then, the control unit 151 cancels the mute instruction to the monitor 110 and the amplifiers 120 and 130 (step S304), and the series of processing events related to authentication ends.

As described above, in the in-vehicle system according to the third embodiment, decrypted results can be generated at the same time even if the decryption timings are different between a plurality of devices. Thus, user dissatisfaction can be prevented.

The present invention is not limited to the foregoing embodiments. Various modifications can be made to the present invention without departing from the spirit and scope thereof. For example, although the timing of a playback operation performed by the content playback unit 102 of the DVD player 100 is not particularly explained in each of the foregoing embodiments, a content playback operation (playback operation of a movie or the like) is preferably stopped until authentication processing for all the devices including the monitor 110 is completed. Accordingly, even if the timing of starting to decrypt content is delayed due to a long time required for authentication processing and the like, an unwanted incomplete or piecemeal production of the initial content by delayed decryption can be prevented.

Figure 7:
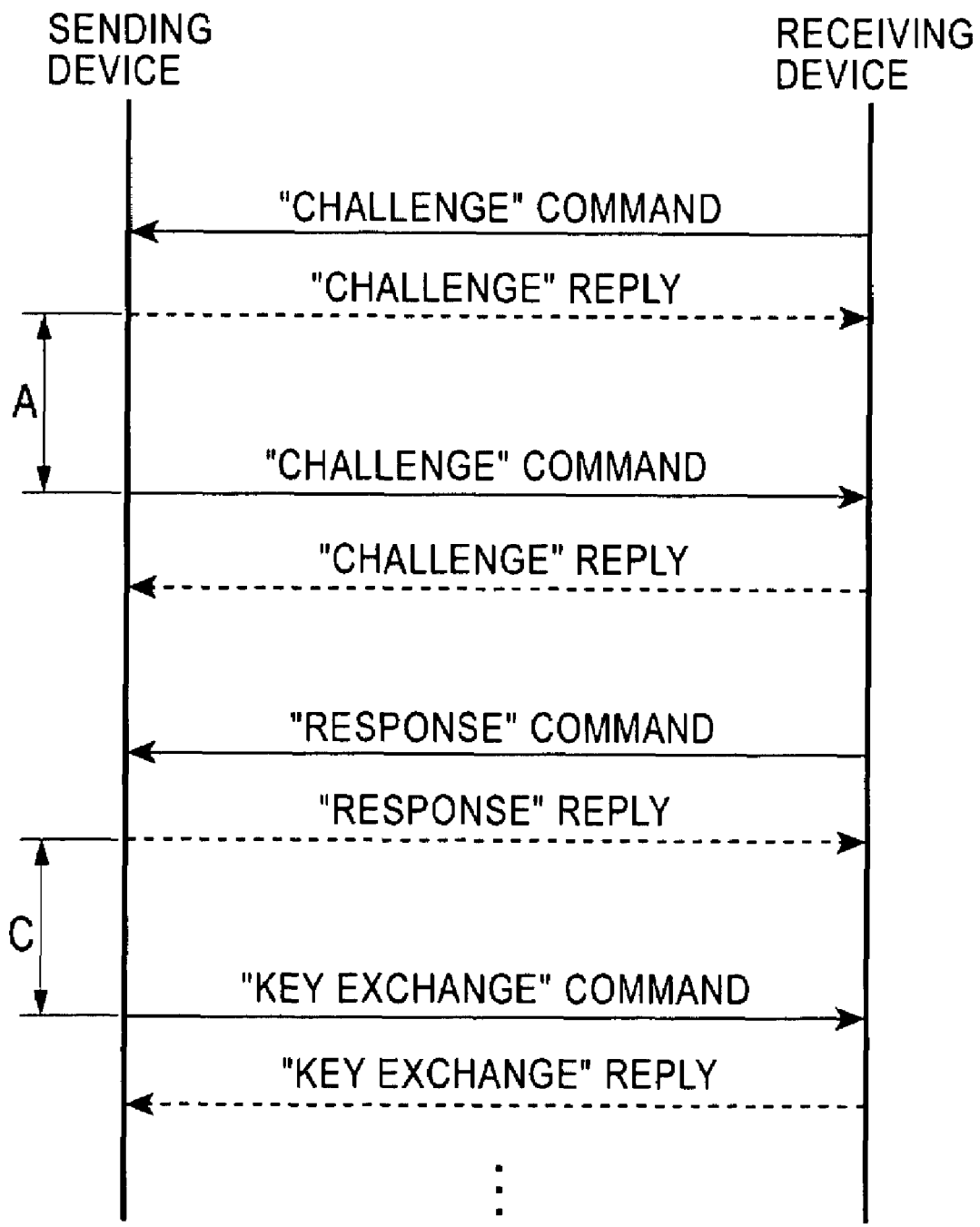
FIG. 7 is a detailed illustration showing the time periods of authentication processing corresponding to restricted authentication and key information transmission.
Figure 8:
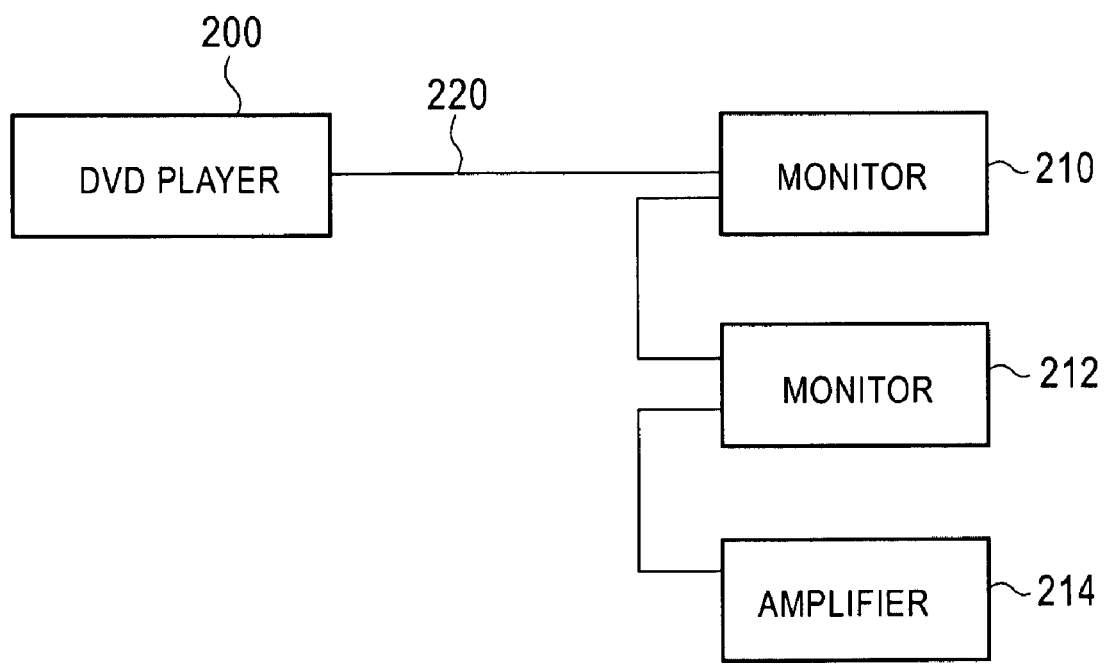
FIG. 8 illustrates a specific connection example of a plurality of devices.

Although the processing timing or time periods shown in FIG. 4 corresponds to full authentication performed for a device not requiring a recording operation, the present invention can also be applied to a device (for example, a hard disk recording device) requiring a recording operation by adopting a processing timing for restricted authentication shown in FIG. 7.

Although an in-vehicle system has been explained in each of the foregoing embodiments, the present invention can also be applied to various systems other than an in-vehicle system.

The invention claimed is:

1. A data transfer device comprising:
a data sending unit operable to send data having encrypted content to a plurality of devices;
an authentication control unit operable to perform authentication processing with each of the plurality of devices; and
a key information unit operable (1) to wait in a state in which authentication processing for each of the plurality of devices to which encrypted content is sent is completed and (2) then send key information for decrypting the encrypted content to each of the plurality of devices only after the authentication processing by the authentication control unit for each of the plurality of devices is completed, such that two or more different content types of the encrypted content are reproduced via the plurality of devices at approximately the same time.

2. The data transfer device according to claim 1, wherein:
the sending of the key information to each of the plurality of devices, respectively, is started by sending a key exchange command; and
the key information unit stops sending the key exchange command until the authentication processing for all of the plurality of devices for which the authentication processing is to be performed is completed.

3. The data transfer device according to claim 2, wherein the plurality of devices includes a device operable to produce sound obtained by decrypting the encrypted content and a device operable to display an image obtained by decrypting the encrypted content.

4. The data transfer device according to claim 2, wherein the plurality of devices includes more than one device operable to produce sound obtained by decrypting the encrypted content.

5. The data transfer device according to claim 2, further comprising a playback unit operable to play back data recorded on a storage medium, wherein
the playback unit does not play back data until the authentication processing is completed.

6. The data transfer device according to claim 2, wherein the plurality of devices is connected via a digital bus.

7. The data transfer device according to claim 2, wherein the authentication processing begins after an authentication start request is sent from each of the plurality of devices.

8. The data transfer device according to claim 2, wherein:
the plurality of devices are not operable to record the encrypted content; and
the authentication control unit performs full authentication processing.

9. A data transfer device comprising:
a data sending unit operable to send data of encrypted content to a plurality of devices whose priority is determined in advance in order of descending priority;
an authentication control unit operable to perform authentication processing with each of the plurality of devices; and
a key information unit operable to send key information for decrypting the encrypted content to each of the plurality of devices for which the authentication processing is completed, wherein
after the authentication processing is completed for each of the plurality of devices, then the key information unit sends the key information to one of the plurality of devices, the data sending unit transmits data to the device having the next highest priority, and reproduction of the encrypted content sent to the device having the next highest priority starts.

10. The data transfer device according to claim 9, further comprising a control unit operable to determine whether or not the key information has been sent to each of the plurality of devices and operable to send to the data sending unit an instruction to send data to the device having the highest priority to which the key information has not been sent.

11. The data transfer device according to claim 10, wherein the plurality of devices includes a device operable to generate sound obtained by decrypting the encrypted content and a device operable to display an image obtained by decrypting the encrypted content.

12. The data transfer device according to claim 11, wherein the plurality of devices is connected via a digital bus.

13. A data transfer device comprising:
a data sending unit operable to send data of encrypted content to a plurality of devices;
an authentication control unit operable to perform authentication processing with each of the plurality of devices;
a key information unit operable to send key information for decrypting the encrypted content to each of the plurality of devices for which the authentication processing is completed; and
an instruction unit operable to send a mute instruction to stop producing an output obtained by decrypting the encrypted content until the key information has been sent to all of the plurality of devices for which the authentication processing is to be performed, such that reproduction of the encrypted content is muted until authentication processing is completed for each of the plurality of devices, after which the instruction unit cancels the mute instruction and encrypted content is reproduced via the plurality of devices.

14. The data transfer device according to claim 13, wherein the plurality of devices includes a device operable to generate sound obtained by decrypting the encrypted content and a device operable to display an image obtained by decrypting the encrypted content.

15. The data transfer device according to claim 14, wherein the instruction unit sends the mute instruction to stop producing an output to each of the plurality of devices.

16. The data transfer device according to claim 15, wherein the stopping of producing an output includes stopping the generation of sound obtained by decrypting the encrypted content and stopping the display of an image obtained by decrypting the encrypted content.

17. The data transfer device according to claim 14, further comprising a playback unit operable to play back data recorded on a storage medium, wherein
the playback unit stops playing back data until the authentication processing is completed.

18. The data transfer device according to claim 14, wherein the plurality of devices is connected via a digital bus.

19. The data transfer device according to claim 14, wherein the authentication processing begins after an authentication start request is sent from each of the plurality of devices.

20. The data transfer device according to claim 14, wherein:
the plurality of devices are not operable to record the encrypted content; and
the authentication control unit performs full authentication processing.

* * * * *